Figure 1:
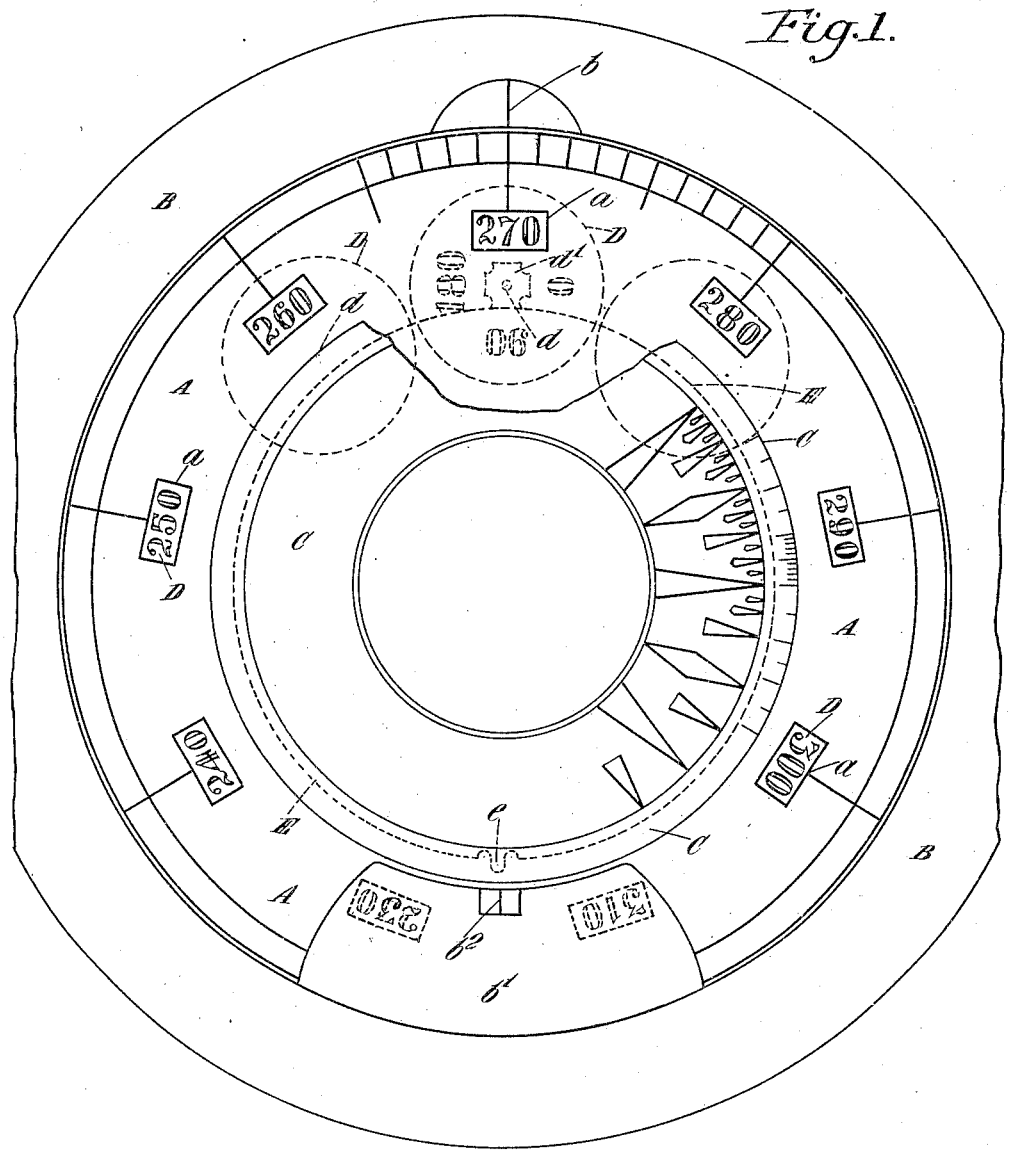

S. G. BROWN.
GYRO COMPASS.
APPLICATION FILED FEB. 12, 1920.

1,362,842.

Patented Dec. 21, 1920.
2 SHEETS—SHEET 1.

Inventor.
Sidney George Brown

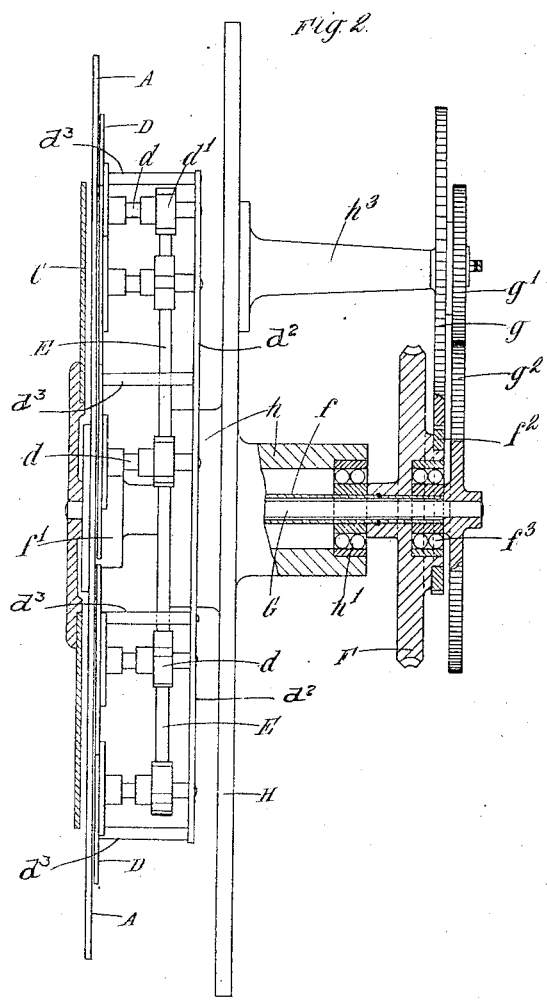
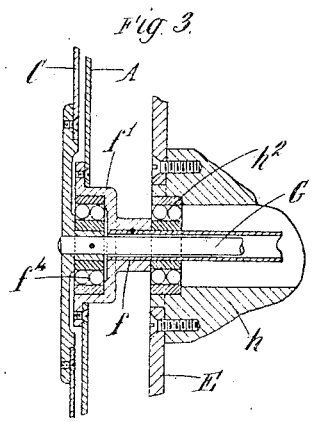

UNITED STATES PATENT OFFICE.

SIDNEY GEORGE BROWN, OF NORTH ACTON, ENGLAND.

GYRO-COMPASS.

1,362,842.  Specification of Letters Patent.  Patented Dec. 21, 1920.

Application filed February 12, 1920. Serial No. 358,268.

*To all whom it may concern:*

Be it known that I, SIDNEY GEORGE BROWN, a subject of the King of Great Britain, residing at Edward Road, Willesden Lane, North Acton, in the county of Middlesex, England, have invented certain new and useful Improvements in or Relating to Gyro-Compasses, of which the following is a specification.

This invention relates to gyro compasses and more particularly to repeaters therefor.

According to this invention, a repeater dial driven at a multiple of the speed of the master compass so as to give a magnified reading is provided with means for automatically changing the indications on the dial so that a correct reading is given by it. Combined with the magnifying dial I may provide a second dial C, preferably placed inside the indicating part of the magnifying dial and concentric therewith, which second dial turns at the same speed as the master compass and shows the true points of the compass.

In order that the said invention may be clearly understood and readily carried into effect the same will now be described more fully with reference to the accompanying drawings in which Figure 1 shows the face of a repeater provided with a pair of dials embodying this invention. Fig. 2 is a side elevation, partly in section, and Fig. 3 is a detail view of the apparatus.

A is the magnifying dial driven by any suitable repeater motor so as to turn at a rate which is a multiple of the rate of turning of the master compass. B is the lubber ring within which the dial turns, provided with a lubber line $b$. C is the inner dial turning at the same rate as the master compass and marked in the usual manner to show the points of the compass. For this dial the lubber ring B is provided with an inwardly projecting segment $b'$ covering part of the dial A and provided with a lubber line $b^2$ for the inner dial, up to the edge of which the segment extends.

The driving of the dials from the usual step by step motor is effected through the worm wheel F on the sleeve $f$ which is connected to the magnifying dial through the boss $f^1$, the central spindle G connected to the normal speed dial C (see Fig. 3) being driven at reduced speed through the pinion $f^2$ on the worm wheel F, the pair of intermediate wheels $g, g^1$ and pinion $g^2$ on the spindle.

The worm wheel F is driven at the magnified angular speed and the reducing gear $f^2$, $g, g^1$ and $g^2$ is of such ratio as to reduce the speed of drive of the spindle G so that the central dial C turns at the same speed as the master compass.

The repeater is carried upon a fixed supporting plate H provided with the central boss $h$ at both sides, having the ball bearings $h^1$, $h^2$ within which the driving sleeve $f$ turns. The central spindle G is in its turn supported in the sleeve $f$ by the ball bearings $f^3$, $f^4$. The gear wheels $g$, $g^1$ are carried by the bracket $h^3$ on the plate H, and the disk E is mounted on the fixed boss $h$.

The indication for the magnifying dial A may be marked on small disks D pivoted at their spindles $d$ on the under side of the dial A, the centers of the disks being on a circle concentric with the center of the dial. Each disk D has a number of indications on it, only one of which on each disk is visible at a time through a corresponding slot $a$ in the magnifying dial and the disks are rotated as they pass a fixed stop $e$ on a disk E when the dial rotates.

The magnifying dial A may be arranged to make four revolutions for one revolution of the master compass. In this case, which is the one illustrated, nine disks D are provided on the dial A, each disk having four indications marked near its periphery at ninety degrees apart, and each disk has attached to its spindle $d$ a four-toothed star wheel $d'$ the spindles being supported at their outer ends by the ring $d^2$ which is carried upon the disk A by means of the supporting posts $d^3$. The other ends of the spindles are supported in the disk A itself. The aforesaid fixed stop $e$ is shown in the form of a tooth on the fixed disk E beneath the dial A, the tooth projecting toward the lubber line $b^2$. As each disk passes the tooth it is rotated through ninety degrees by the engagement of the tooth $e$ with the star wheel $d'$ on the disk, thereby bringing a new indication into view through the associated slot $a$.

The slots $a$ are opposite graduations on the dial which divide the dial into nine parts, each part being again divided into ten parts which indicate degrees. The disk which is opposite the north point of the lubber line when the ship is sailing due north is marked in a clockwise direction with the numbers 0, 90, 180, and 270; the next disk to the right with the numbers 10, 100, 190 and 280; the next disk to the left is marked 350, 80, 170 and 260, and so on. When the ship is sailing due north the number 0 is visible on the lubber line *b*. When the dial has made half a revolution in the anti-clockwise direction, the disk carrying the 0 graduation is rotated through ninety degrees so that the 90 degrees graduation is visible and so on for the other disks. By this arrangement the dial always indicates the course correctly in degrees.

The dial may be divided into say 30 degrees instead of 90 degrees and in this case three disks with 12 numbers or indications thereon are provided, or any other appropriate division of the dial may be carried out.

Though the arrangement described is particularly applicable to what are ordinarily termed repeater compasses a similar dial may be employed on or associated with the master compass to give a magnified reading of the same, the dial being moved electrically or mechanically by the gyro, and the ordinary dial of the master compass may be dispensed with, or it may be associated with the magnifying dial, in which case it would be represented by the dial C in the drawing, while in the arrangement illustrated the normal speed dial C is driven by reducing gearing from the magnifying dial A or repeater motor. This method of driving is shown merely as an example.

What I claim and desire to secure by Letters Patent of the United States is:—

1. In a gyro compass, a dial adapted to be driven at a multiple of the speed of the master compass and angle indicators adapted to be automatically changed as the dial rotates so as to give the correct reading on the dial.

2. In a gyro compass, a dial adapted to be driven at a multiple of the speed of the master compass, rotatable angle indicators exposed at the said dial and means for turning the said indicators automatically as the dial rotates so as to give the correct reading on the dial.

3. In a gyro compass, a dial adapted to be driven at a multiple of the speed of the master compass, a series of disks mounted on the said dial and situated behind a ring of openings in the dial, which disks are marked to indicate the true angles, and means by which the said disks are turned automatically at each revolution of the dial, for the purpose specified.

4. In a gyro compass, a dial adapted to be driven at a multiple of the speed of the master compass, a series of disks mounted on the said dial and situated behind a ring of openings in the dial, which disks are marked to indicate the true angles, a star wheel mounted on each disk and a fixed tooth distant from the point at which the compass reading is taken, which tooth effects a partial rotation of the disk as it passes the tooth, for the purpose specified.

5. In a gyro-compass, a dial adapted to be driven at a multiple of the speed of the master compass, angle indicators adapted to be automatically changed as the dial rotates so as to give the correct reading on the dial and a second concentrically mounted dial associated with the multiple speed dial through gearing adapted to drive the said second dial at the same speed as the master compass.

SIDNEY GEORGE BROWN.